(12) United States Patent
Al-Ghamdi et al.

(10) Patent No.: US 11,203,684 B1
(45) Date of Patent: Dec. 21, 2021

(54) METHOD FOR MAKING AN ELASTOMERIC CONDUCTIVE NANOCOMPOSITE

(71) Applicants: King Abdulaziz University, Jeddah (SA); King Khalid University, Abha (SA)

(72) Inventors: Ahmed A. Al-Ghamdi, Jeddah (SA); Abdullah G. Al-Sehemi, Abha (SA); Abul Kalam, Abha (SA); Aysegul Dere, Elazig (TR); Fahrettin Yakuphanoglu, Elazig (TR)

(73) Assignees: King Abdulaziz University, Jeddah (SA); King Khalid University, Abha (SA)

( * ) Notice: Subject to any disclaimer, the term of this patent is extended or adjusted under 35 U.S.C. 154(b) by 0 days.

(21) Appl. No.: 17/356,650

(22) Filed: Jun. 24, 2021

Related U.S. Application Data

(60) Division of application No. 17/199,520, filed on Mar. 12, 2021, which is a continuation of application No. 16/995,336, filed on Aug. 17, 2020, now Pat. No. 10,982,082.

(51) Int. Cl.

| | |
|---|---|
| *C08L 23/22* | (2006.01) |
| *G01K 7/22* | (2006.01) |
| *C08L 71/02* | (2006.01) |
| *C08K 3/04* | (2006.01) |
| *B82Y 40/00* | (2011.01) |
| *C08K 3/08* | (2006.01) |
| *B82Y 30/00* | (2011.01) |

(52) U.S. Cl.
CPC .............. *C08L 23/22* (2013.01); *C08K 3/042* (2017.05); *C08L 71/02* (2013.01); *G01K 7/22* (2013.01); *B82Y 30/00* (2013.01); *B82Y 40/00* (2013.01); *C08K 2003/0856* (2013.01); *C08K 2201/001* (2013.01); *C08K 2201/005* (2013.01); *C08K 2201/011* (2013.01)

(58) Field of Classification Search
CPC ......... C08L 23/22; C08L 71/02; C08K 3/042; C08K 2003/0856; C08K 2201/001; C08K 2201/005; C08K 2201/011
USPC .................................................. 524/440, 496
See application file for complete search history.

(56) References Cited

U.S. PATENT DOCUMENTS

| | | | |
|---|---|---|---|
| 10,982,082 B1* | 4/2021 | Al-Ghamdi | ............ H01C 7/027 |
| 2010/0029823 A1 | 2/2010 | Hong et al. | |
| 2010/0096597 A1 | 4/2010 | Robert et al. | |
| 2020/0317918 A1 | 10/2020 | Toolis | |

FOREIGN PATENT DOCUMENTS

| | | |
|---|---|---|
| CN | 1137185 C | 2/2004 |
| CN | 106905743 A | 6/2017 |
| KR | 10-1036148 B1 | 5/2011 |

OTHER PUBLICATIONS

Daniele Frasca, et al., "Multilayer Graphene/Carbon Black/Chlorine Isobutyl Isoprene Rubber Nanocomposites", POLYMERS, vol. 8, No. 95, 2016, pp. 1-17.
Wook-Soo Kim, et al., "Effect of polyethylene glycol on the properties of styrene-butadiene rubber/organoclay nanocomposites filled with silica and carbon black", Journal of Applied Polymer Science, vol. 122, Issue 3, Jun. 9, 2011, pp. 1766-1777 (Abstract only).
Farid El-Tantawy, et al., "Novel V-Shaped Negative Temperature Coefficient of Conductivity Thermistors and Electromagnetic Interference Shielding Effectiveness from Butyl Rubber-Loaded Boron Carbide Ceramic Composites", Journal of Applied Polymer Science, vol. 91, Issue 5, Jan. 13, 2004, pp. 2756-2770 (Abstract only).
Farid El-Tantawy, et al., "New PTCR Thermistors, Switching Current, and Electromagnetic Shielding Effectiveness from Nanosized Vanadium Sesquioxides Ceramic Reinforced Epoxy Resin Nanocomposites", Journal of Applied Polymer Science, vol. 115, Issue 2, Sep. 14, 2009, pp. 815-825 (Abstract only).
Salih S. Al-Juaid, et al., "Novel Functional Nitrile Butadiene Rubber/Magnetite Nano Composites for NTCR Thermistors Application", Journal of Applied Polymer Science, vol. 121, Issue 6, Apr. 12, 2011, pp. 3604-3612 (Abstract only).
Gengcheng Yang, "Effect of Crosslinking and Field Strength on the Electrical Properties of Carbon/Polyolefin Composites With a Large Positive Temperature Coefficient of Resistivity", Polymer Composites, vol. 18, Issue 4, Apr. 15, 2004, pp. 484-491 (Abstract only).
Z. Todorova, et al., "Natural Rubber Filled SiC and $B_4C$ Ceramic Composites as a New NTC Thermistors and Piezoresistive Sensor Materials", Polymer Composites, vol. 29, Issue 1, Dec. 4, 2007, pp. 109-118 (Abstract only).

* cited by examiner

*Primary Examiner* — Edward J Cain
(74) *Attorney, Agent, or Firm* — Oblon, McClelland, Maier & Neustadt, L.L.P.

(57) ABSTRACT

A conductive nanocomposite which contains a mixed polymer matrix which contains a rubber and a polyether, carbon nanoparticles, and transition metal nanoparticles. The conductive nanocomposite has a nonlinear relationship between resistivity and temperature characterized by an exponential increase reaching a peak resistivity followed by an exponential decrease as temperature increases. Also disclosed is a method of forming the conductive nanocomposite involving mixing the components, aging, and pressing. The conductive nanocomposite forms a component of a heater that is self-regulating as a result of the nonlinear relationship between resistivity and temperature of the conductive nanocomposite. The nanocomposite also forms a component of a thermistor.

7 Claims, 6 Drawing Sheets

METHOD FOR MAKING AN ELASTOMERIC CONDUCTIVE NANOCOMPOSITE

CROSS-REFERENCE TO RELATED APPLICATIONS

The present application is a Divisional of U.S. application Ser. No. 17/199,520, pending, having a filing date of Mar. 12, 2021, which is a continuation of U.S. application Ser. No. 16/995,336, now U.S. Pat. No. 10,982,082, having a filing date of Aug. 17, 2020.

BACKGROUND OF THE INVENTION

Technical Field

The present invention relates to a conductive nanocomposite containing a polymer matrix, carbon nanoparticles, and transition metal nanoparticles. The conductive nanocomposite has a nonlinear relationship between resistivity and temperature characterized by a PTC region and an NTC region and a method of forming said nanocomposite.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conductive nanocomposites formed from polymer matrices are important materials in a wide variety of applications such as consumer electronics, medicine, and energy production. These applications arise because such conductive nanocomposites are able to take advantage of the desirable mechanical properties and resistance to degradation of polymers but overcome the large disadvantage of the lack of electrical conductivity that polymers exhibit. The resistivity or conductivity of a polymer matrix is normally controlled by additives. Both the identity and the amount of the additives in the polymer matrix can be varied to adjust these values to desirable limits. A principal drawback is that after forming, the identity and amount of additives cannot be changed. Therefore, the resistivity or conductivity of a nanocomposite is typically fixed. Some materials, however, display temperature dependent resistivity. Using temperature to control resistivity is desirable as a way of making a controlled electric circuit or a sensor While these materials may display a nonlinear change in resistivity with temperature, it is usually monotonic. A material with distinct regions of either increasing or decreasing resistivity as temperature changes would be desirable for applications such as dual temperature coefficient thermistors or self-regulating heaters.

In view of the foregoing, one objective of the present invention is to provide a conductive nanocomposite that includes a mixed polymer matrix of a rubber and a polyether, carbon nanoparticles, and transition metal nanoparticles, and which has a nonlinear relationship between resistivity and temperature characterized by an exponential increase reaching a peak resistivity followed by an exponential decrease as temperature increases. The exact value of the resistivity and peak resistivity and the characteristics of the exponential increase and decrease may be controlled by the composition of the conductive nanocomposite.

BRIEF SUMMARY OF THE INVENTION

According to a first aspect, the present disclosure relates to a conductive nanocomposite comprising a mixed polymer matrix comprising a rubber and a polyether, carbon nanoparticles, and transition metal nanoparticles, wherein the conductive nanocomposite has a nonlinear relationship between resistivity and temperature in the region of 25 to 180° C. characterized by an exponential increase reaching a peak resistivity followed by an exponential decrease, and the conductive nanocomposite has a peak resistivity of 2500 to 18000 ohm·cm at a temperature of 100 to 180° C.

In some embodiments, the rubber is isobutylene isoprene rubber.

In some embodiments, the polyether is polyethylene oxide.

In some embodiments, the carbon nanoparticles are present in an amount of 0.1 to 5 wt % based on a total weight of the conductive nanocomposite.

In some embodiments, the carbon nanoparticles are graphene nanosheets.

In some embodiments, the graphene nanosheets are in the form of particles having a mean particle size of 0.33 to 50 nm.

In some embodiments, the transition metal nanoparticles are present in an amount of 0.5 to 10 wt % based on a total weight of the conductive nanocomposite.

In some embodiments, the transition metal nanoparticles have a mean particle size of 0.33 to 50 nm.

In some embodiments, the transition metal nanoparticles are carbonyl iron nanoparticles.

In some embodiments, the conductive nanocomposite has a positive temperature coefficient in a first temperature region and a negative temperature coefficient in a second temperature region.

The present disclosure also relates to a method of forming the conductive nanocomposite comprising mixing a rubber, a polyether, carbon nanoparticles, and transition metal nanoparticles at 20 to 50° C. for 30 minutes to 4 hours to form a mixture, aging the mixture for 24 to 168 hours to form an aged mixture, and pressing the aged mixture at a temperature of 100 to 180° C.

In some embodiments, the pressing is performed at 1 to 1000 kN/m².

In some embodiments, the pressing is performed for 1 to 10 hours.

The present disclosure also relates to a heater comprising the conductive nanocomposite of claim 1 sandwiched between metal electrodes.

In some embodiments, the heater has a heating exchange coefficient by convection of 1 to 100 $Wm^{-2}K^{-1}$.

In some embodiments, the heater has a heating exchange coefficient by radiation of 0.5 to 50 $Wm^{-2}K^{-1}$.

In some embodiments, the heater reaches a maximum working temperature of 40 to 130° C. when subjected to a working power of 0.11 to 0.21 W/cm³.

In some embodiments, the heater is a self-regulating heater and is operated in the first temperature region of the nanocomposite where the nanocomposite has a positive temperature coefficient.

The present disclosure also relates to a thermistor comprising the conductive nanocomposite.

In some embodiments, the thermistor has a positive temperature coefficient in a first thermistor temperature region and a negative temperature coefficient in a second thermistor temperature region.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
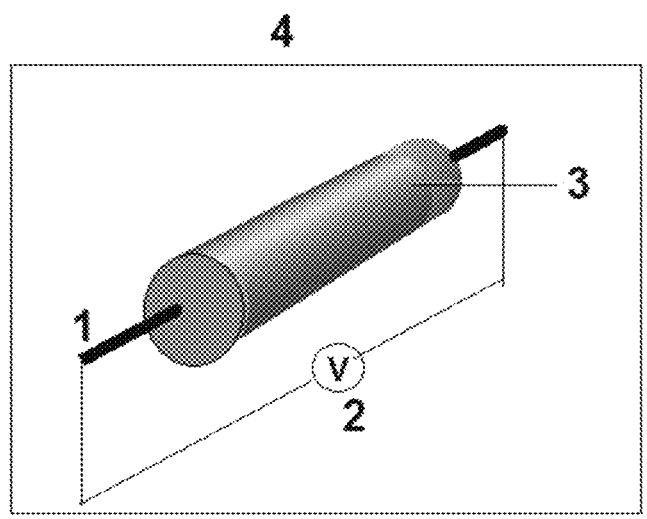
FIG. 1 is a schematic diagram of the nanocomposite heater device.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "composite" refers to a combination of two or more distinct constituent materials into one continuous or discontinuous mass. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

As used herein, "conductive" means having a resistivity less than $10^5$ ohm·cm at 30° C. to 180° C.

According to a first aspect, the present disclosure relates to a conductive nanocomposite comprising a mixed polymer matrix, carbon nanoparticles, and transition metal nanoparticles. The mixed polymer matrix may comprise a rubber and a polyether. The rubber and the polyether may be referred to as components of the polymer matrix.

Rubber is an elastomeric polymer. Rubber may be natural rubber (also called latex, India rubber, or Amazonian rubber) or synthetic rubber. Natural rubber consists of polymers of isoprene typically collected from the plant *Hevea brasiliensis*, also known as the rubber tree, along with other natural ingredients such as proteins, polysaccharides, and the like. Synthetic rubber is an elastomeric polymer typically made from various hydrocarbon or petroleum-derived monomers. Examples of polymers that may be considered synthetic rubbers are polystyrene-butadine, polyisoprene, polychloroprene (poly-2-chloro-1,3-butadiene), polyisobutylene, and mixtures of these. In some embodiments, the rubber is a synthetic rubber. In some embodiments, the rubber is isobutylene isoprene rubber (IIR). In some embodiments, the rubber has an unsaturation percentage (also known as an isoprene content) of 0.9 to 2.5 mol %, preferably 1.0 to 2.4 mol %, preferably 1.1 to 2.3 mol %, based on a total number of moles of isobutylene and isoprene used in the manufacture of the IIR. In some embodiments, the rubber has a Mooney viscosity ($ML_{1+8}$) of 29 to 55, preferably 30 to 54, preferably 31 to 53, preferably 32 to 51 at 125° C. In some embodiments, the rubber is substantially free of halogens. In alternative embodiments, the rubber has a halogen content of 1.0 to 2.5 wt %, preferably 1.1 to 2.4 wt %, preferably 1.25 to 2.25 wt % based on a total weight of the rubber.

Examples of polyethers include polymethylene oxide, polyethylene oxide, polypropylene oxide, polydioxanone, polytetrahydrofuran, polyphenyl ether, and the like. In some embodiments, the polyether is polyethylene oxide. In some embodiments, the polyethylene oxide has an average molecular weight of 20,000 g/mol to 5,000,000 g/mol, preferably 50,000 g/mol to 4,000,000 g/mol, preferably 100,000 to 3,000,000 g/mol, preferably 200,000 to 2,500,000 g/mol, preferably 300,000 to 2,000,000 g/mol, preferably 400,000 to 1,750,000 g/mol. In some embodiments, the average molecular weight is a viscosity average molecular weight.

In some embodiments, the polymer matrix further comprises at least one additional polymer, which may include, but is not limited to, polysiloxanes such as polydimethylsiloxane, polyolefins such as ploylethylene, polystyrene, polyisoprene, and mixtures of these, polyacrylates such as polymethylmethacrylate, polyamides, polycarbonates, polysulfones, polyimides, celluloses, poly(halogenated olefins) such as polyvinylidene difluoride and polyvinyl chloride, polyamide-imides, and phenolic resins.

The carbon nanoparticles may be carbon nanotubes, fullerenes, fullerene whiskers, carbon nanobuds, carbon nanoscrolls, activated carbon, carbon black, graphene, and the like.

In some embodiments, the carbon nanoparticles are graphene. In some embodiments, the carbon nanoparticles are graphene nanosheets. Graphene nanosheets may consist of stacks of graphene sheets, the stacks having an average thickness and a diameter. In some embodiments, the stacks comprise 1 to 60 sheets of graphene, preferably 2 to 30 sheets of graphene, preferably 3 to 10 sheets of graphene. In some embodiments, the graphene nanosheets have a thickness of 0.33 to 20 nm, preferably 0.34 to 10 nm, preferably 0.66 to 5 nm, preferably 0.99 to 3.3 nm. In some embodiments, the graphene nanosheets have a diameter of 0.33 to 50 nm, preferably 0.5 to 40 nm, preferably 1 nm to 30 nm, preferably 2 to 20 nm, preferably 4 to 15 nm, preferably 5 to 12 nm, preferably 6 to 10 nm, preferably 7 to 9 nm. In some embodiments, the graphene nanosheets have a monodisperse thickness, having a coefficient of variation or relative standard deviation, expressed as a percentage and defined as the ratio of the graphene nanosheet thickness standard deviation ($\sigma$) to the graphene nanosheet thickness mean ($\mu$), multiplied by 100%, of less than 25%, preferably less than 10%, preferably less than 8%, preferably less than 6%, preferably less than 5%. In a preferred embodiment, the graphene nanosheets have a monodisperse thickness, having a size distribution ranging from 80% of the average thickness to 120% of the average thickness, preferably 85 to 115%, preferably 90 to 110% of the average thickness. In another embodiment, the graphene nanosheets do not have a monodisperse thickness. In some embodiments, the graphene nanosheets have a monodisperse diameter, having a coefficient of variation or relative standard deviation, expressed as a percentage and defined as the ratio of the graphene nanosheet diameter standard deviation ($\sigma$) to the graphene nanosheet diameter mean ($\mu$), multiplied by 100%, of less than 25%, preferably less than 10%, preferably less than 8%, preferably less than 6%, preferably less than 5%. In a preferred embodiment, the graphene nanosheets have a monodisperse diameter, having a size distribution ranging from 80% of the average diameter to 120% of the average diameter, preferably 85 to 115%, preferably 90 to 110% of the average diameter. In another embodiment, the graphene nanosheets do not have a monodisperse diameter.

In alternative embodiments, the graphene is in the form of graphene particles. In some embodiments, the graphene particles have an average particle size of 0.33 to 50 nm, preferably 0.5 to 40 nm, preferably 1 nm to 30 nm, preferably 2 to 20 nm, preferably 4 to 15 nm, preferably 5 to 12 nm, preferably 6 to 10 nm, preferably 7 to 9 nm. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles are in the form of flakes, ribbons, discs, or platelets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the graphene particles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean size of the primary particles. The primary particles may be the graphene particles having a mean size as previously described. In some embodiments, the graphene particles are monodisperse, having a coefficient of variation or relative standard deviation, expressed as a percentage and defined as the ratio of the graphene particle size standard deviation ($\sigma$) to the graphene particle size mean ($\mu$), multiplied by 100%, of less than 25%, preferably less than 10%, preferably less than 8%, preferably less than 6%, preferably less than 5%. In a preferred embodiment, the graphene particles are monodisperse, having a graphene particle size distribution ranging from 80% of the average particle size to 120% of the average particle size, preferably 85 to 115%, preferably 90 to 110% of the average particle size. In another embodiment, the graphene particles are not monodisperse.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene. In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2$/g. In some embodiments, the carbon nanoparticles are activated carbon having a mean particle size of 1 to 250 nm, preferably 2 to 200 nm, preferably 5 nm to 175 nm, preferably 10 to 150 nm, preferably 15 to 125 nm, preferably 25 to 100 nm. The activated carbon particles may have a spherical shape, or may be shaped like blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance. In some embodiments, the activated carbon particles are in the form of blocks, flakes, granules, discs angular chunks, rectangular prisms, or platelets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the activated carbon particles may be in the form of agglomerates as described above. In some embodiments, the activated carbon particles are monodisperse as described above. In alternative embodiments, the activated carbon particles are not monodisperse.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. In some embodiments, the carbon nanoparticles are carbon black having a mean particle size of 1 to 500 nm, preferably 2 to 400 nm, preferably 5 nm to 350 nm, preferably 10 to 300 nm, preferably 15 to 250 nm, preferably 25 to 200 nm. The carbon black particles may have a spherical shape, or may be shaped like blocks, flakes, ribbons, discs, granules, platelets, angular chunks, rectangular prisms, or some other shape. In some embodiments, the carbon black particles may be substantially spherical, as described above. In some embodiments, the carbon black particles are in the form of blocks, flakes, granules, discs angular chunks, rectangular prisms, or platelets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the carbon black particles may be in the form of agglomerates as described above. In some embodiments, the carbon black particles are monodisperse as described above. In alternative embodiments, the carbon black particles are not monodisperse.

In some embodiments, the carbon nanoparticles are a single type of carbon nanoparticle as described above. In alternative embodiments, mixtures of types of carbon nanoparticles are used. In some embodiments, the carbon nanoparticles are present in an amount of 0.1 to 5 wt %, preferably 0.25 to 4 wt %, preferably 0.5 to 3 wt %, preferably 1 to 2.5 wt %, based on a total weight of the conductive nanocomposite.

The transition metal nanoparticles may be metallic particles of a transition metal. In some embodiments, the transition metal nanoparticles comprise a single transition metal. In alternative embodiments, the transition metal nanoparticles comprise two or more transition metals. In some embodiments, the transition metal nanoparticles comprise a transition metal selected from the group consisting of scandium, titanium, vanadium, chromium, manganese, iron, cobalt, nickel, copper, zinc, and silver. In some embodiments, the transition metal nanoparticles are magnetic transition metal nanoparticles. In some embodiments, the transition metal nanoparticles are carbonyl metal nanoparticles. Carbonyl metal refers to a metal having a purity of greater than 97.5%, preferably greater than 98%, preferably greater than 98.5%, preferably greater than 99%, preferably greater than 99.5% and prepared by decomposition of purified metal carbonyl complex. Examples of carbonyl metals include carbonyl iron, carbonyl nickel, and carbonyl cobalt. In some embodiments, the transition metal nanoparticles are iron nanoparticles. In some embodiments, the transition metal nanoparticles are carbonyl iron nanoparticles. Carbonyl iron nanoparticles are distinct from other types of iron nanoparticles by the high purity (greater than 97.5 wt % iron) of iron and the elemental composition of the non-iron portion. Carbonyl iron nanoparticles typically have a non-iron metal content of less than 0.1 wt %, preferably less than 0.09 wt %, preferably less than 0.08 wt %, preferably less than 0.075 wt %, preferably less than 0.05 wt % and a nitrogen content of less than 0.2 wt % preferably less than 0.175 wt %, preferably less than 0.150 wt %, preferably less than 0.125 wt %, preferably less than 0.1 wt %, based on a total weight of the carbonyl iron nanoparticles. Carbonyl iron nanoparticles do not have surface capping agents such as amines, carboxylates, polyols, and the like that are present on iron nanoparticles made by solution-phase methods. In some embodiments, the transition metal nanoparticles are in the form of particles having an average particle size of 0.33 to 50 nm, preferably 0.5 to 40 nm, preferably 1 nm to 30 nm, preferably 2 to 20 nm, preferably 4 to 15 nm, preferably 5 to 12 nm, preferably 6 to 10 nm, preferably 7 to 9 nm. The transition metal nanoparticles may have a spherical shape, or may be shaped like blocks, flakes, ribbons, discs, granules, platelets, angular chunks, rectangular prisms, or some other shape. In some embodiments, the transition metal nanoparticles may be substantially spherical as described above. In some embodiments, the transition metal nanoparticles are in the form of blocks, flakes, granules, discs angular chunks, rectangular prisms, or platelets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the transition metal nanoparticles may be in the form of agglomerates as described above. In some embodiments, the transition metal nanoparticles are monodisperse as described above. In alternative embodiments, the transition metal nanoparticles are not monodisperse. In some embodiments, the transition metal nanoparticles are present in an amount of 0.5 to 10 wt %, preferably 0.75 to 7.5 wt %, preferably 0.9 to 6 wt %, preferably 1 to 5 wt %, based on a total weight of the conductive nanocomposite.

In some embodiments, the carbon nanoparticles and transition metal nanoparticles are homogenously distributed throughout the mixed polymer matrix. In some embodiments, the mixed polymer matrix has a homogenous structure, meaning no phase separation of the rubber and polyether is observed. In alternative embodiments, the mixed polymer matrix has a non-homogenous structure with separate portions of rubber and polyether. In some embodiments, the non-homogenous structure of the polymer matrix is a "sea-island" structure where one of the components (i.e. either the rubber or the polyether) forms a continuous volume of material, referred to as the "sea", while the other component forms discrete pockets of material, referred to as the "islands", distributed throughout the continuous volume of the other component. In some embodiments, the carbon nanoparticles are preferentially localized to one of the components more so than the other. In some embodiments, the transition metal nanoparticles are preferentially localized to one of the components more so than the other. In some embodiments, the carbon nanoparticles and transition metal nanoparticles are preferentially localized to the same component of the polymer matrix. In alternative embodiments, the carbon nanoparticles and transition metal nanoparticles are preferentially localized to different components of the polymer matrix.

The conductive nanocomposite has a nonlinear relationship between resistivity and temperature in the region of 25 to 180° C. This nonlinear relationship is characterized by an exponential increase as temperature increases, reaching a peak resistivity at a peak resistivity temperature, followed by an exponential decrease as temperature increase above the temperature of peak resistivity. As used herein, "exponential increase" and "exponential decrease" refer to an increase and decrease, respectively, that can be modeled mathematically by an exponential function. In some embodiments, the nonlinear relationship may be modeled mathematically by a single exponential function, such as a Gaussian, that is increasing over an interval, reaches a peak, and then is decreasing over an interval.

In some embodiments, the peak resistivity is 2500 to 18000 ohm·cm, preferably 2750 to 17500 ohm·cm, preferably 2800 to 17000 ohm·cm, preferably 2900 to 16750 ohm·cm, preferably 3000 to 16500 ohm·cm, preferably 3100 to 16250 ohm·cm, preferably 3250 to 16100 ohm·cm. In some embodiments, the peak resistivity occurs at a temperature of 100 to 180° C., preferably 105 to 177.5° C., preferably 110 to 175° C., preferably 115 to 172.5° C., preferably 120 to 170° C., preferably 122.5 to 167.5° C. In some embodiments, the peak resistivity decreases as the content of carbon nanoparticles increases. In some embodiments the conductive nanocomposite has a peak resistivity 12000 to 16000 ohm·cm, preferably 13500 to 15500 ohm·cm, preferably 14000 to 15250 ohm·cm, preferably 14500 to 15000 ohm·cm when the conductive nanocomposite has 0.25 to 1.75 wt % carbon nanoparticles, preferably 0.5 to 1.5 wt % carbon nanoparticles, preferably 0.75 to 1.25 wt % carbon nanoparticles, preferably 0.9 to 1.1 wt % carbon nanoparticles based on a total weight of the conductive nanocomposite. In some embodiments the conductive nanocomposite has a peak resistivity 2500 to 4000 ohm·cm, preferably 2750 to 3750 ohm·cm, preferably 3000 to 3500 ohm·cm when the conductive nanocomposite has 3.25 to 4.75 wt % carbon nanoparticles, preferably 3.5 to 4.5 wt % carbon nanoparticles, preferably 3.75 to 4.25 wt % carbon nanoparticles, preferably 3.9 to 4.1 wt % carbon nanoparticles based on a total weight of the conductive nanocomposite. In some embodiments, the conductive nanocomposite has a peak resistivity temperature that increases as the content of carbon nanoparticles increases. In some embodiments, the conductive nanocomposite has a peak resistivity temperature of 130 to 155° C., preferably 135 to 150° C., preferably 137.5 to 147.5° C., preferably 140 to 145° C. when the conductive nanocomposite has 0.25 to 1.75 wt % carbon nanoparticles, preferably 0.5 to 1.5 wt % carbon nanoparticles, preferably 0.75 to 1.25 wt % carbon nanoparticles, preferably 0.9 to 1.1 wt % carbon nanoparticles based on a total weight of the conductive nanocomposite. In some embodiments, the conductive nanocomposite has a peak resistivity temperature of 150 to 180° C., preferably 155 to 175° C., preferably 160 to 172.5° C., preferably 162.5 to 170° C. when the conductive nanocomposite has 3.25 to 4.75 wt % carbon nanoparticles, preferably 3.5 to 4.5 wt % carbon nanoparticles, preferably 3.75 to 4.25 wt % carbon nanoparticles, preferably 3.9 to 4.1 wt % carbon nanoparticles based on a total weight of the conductive nanocomposite.

A temperature coefficient of resistance is a physical parameter of a material that describes the relationship between the electrical resistance of the material and the temperature of the material. A positive temperature coefficient indicates that resistance increases with temperature. A negative temperature coefficient indicates that resistance decreases with temperature. The increase or decrease in resistance does not need to be defined by a linear relationship. The temperature coefficient of resistance itself may take on different values in different temperature regions. In some embodiments, the conductive nanocomposite has a positive temperature coefficient in a first temperature region and a negative temperature coefficient in a second temperature region. In some embodiments, the first temperature region is lower temperature than the second temperature region. In some embodiments, the first temperature region lies below the peak resistivity temperature. In some embodiments, the second temperature region lies above the peak resistivity temperature. In some embodiments, the temperature of the material is determined by measuring the resistivity of the material. In some embodiments, the first temperature region is 30 to 100° C., preferably 30.1 to 105° C., preferably 30.2 to 110° C., preferably 30.3 to 115° C., preferably 30.4 to 120° C., preferably 30.5 to 122.5° C. and the second temperature region is 125 to 180° C. In alternative embodiments, the first temperature region is 30 to 130° C., preferably 30.1 to 135° C., preferably 30.2 to 140° C., preferably 30.3 to 145° C., preferably 30.4 to 150° C., preferably 30.5 to 155° C., preferably 30.6 to 160° C., preferably 30.7 to 165° C. and the second temperature region is 170 to 180° C.

According to a second aspect, the present disclosure also relates to a method for forming the conductive nanocomposite. The method involves roll-mixing a rubber, a polyether, carbon nanoparticles, and transition metal nanoparticles to form a mixture, aging the mixture, and pressing to form the conductive nanocomposite.

In some embodiments, the mixing may be performed using equipment such as a V blender, a ribbon blender, a twin-screw continuous blender, a single screw blender, a double cone blender, a planetary mixer, a double planetary mixer, a paddle mixer, a tumbling mixer, a drum blender, a horizontal mixer, a roll-mixer, or the like. In preferred embodiments, the mixing is roll-mixing. In some embodiments, the roll-mixing is performed at 25 to 50° C., preferably 26 to 45° C., preferably 27.5 to 40° C., preferably 29 to 35° C., preferably 30° C. In some embodiments, the roll-mixing is performed for 30 minutes to 4 hours, preferably 45 minutes to 3.5 hours, preferably 1 hour to 3 hours, preferably 1.25 to 2.75 hours, preferably 1.5 to 2.5 hours, preferably 1.75 to 2.25 hours, preferably 1.9 to 2.1 hours, preferably 2 hours. In some embodiments, the roll-mixing is performed on a two roll mill. In some embodiments, the two roll mill has a roll diameter of 50 to 250 mm, preferably 75 to 225 mm, preferably 100 to 200 mm, preferably 125 to 175 mm, preferably 150 mm. In some embodiments, the two roll mill has a working distance of 75 to 325 mm, preferably 100 to 300 mm, preferably 125 to 275 mm, preferably 150 to 250 mm, preferably 175 to 225 mm, preferably 200 mm. In some embodiments, the two roll mill has a slow speed of 1 to 100 rpm, preferably 5 to 50 rpm, preferably 10 to 25 rpm, preferably 15 rpm. In some embodiments, the two roll mill is actively cooled to prevent heat generation during mixing. This mixing step produces a mixture.

Following the mixing, the mixture is aged. In some embodiments, the aging is performed for 24 to 168 hours, preferably 30 to 162 hours, preferably 36 to 156 hours, preferably 42 to 150 hours, preferably 48 to 144 hours, preferably 54 to 138 hours, preferably 60 to 132 hours, preferably 66 to 126 hours, preferably 68 to 96 hours, preferably 70 to 90 hours, preferably 71 to 84 hours, preferably 72 hours. This aging step produces an aged mixture Following the aging, the aged mixture is pressed. In some embodiments, the pressing is performed at a temperature of 100 to 180° C., preferably 110 to 170° C., preferably 120 to 160° C., preferably 130 to 150° C., preferably 135 to 145° C., preferably 140° C. In some embodiments, the pressing is performed with a pressure of 1 to 1000 kN/m$^2$, preferably 10 to 750 kN/m$^2$, preferably 25 to 500 kN/m$^2$, preferably 50 to 400 kN/m$^2$, preferably 100 to 300 kN/m$^2$, preferably 150 to 250 kN/m$^2$, preferably 175 to 225 kN/m$^2$, preferably 190 to 210 kN/m$^2$, preferably 200 kN/m$^2$. In some embodiments, the pressure is applied for 1 to 10 hours, preferably 2 to 8 hours, preferably 3 to 7 hours, preferably 4 to 6 hours, preferably 4.5 to 5.5 hours, preferably 5 hours.

According to a third aspect, the present disclosure also relates to a heater comprising the conductive nanocomposite of sandwiched between metal electrodes. In some embodiments, the metal electrodes are formed from a metal selected from the group consisting of stainless steel, aluminum, iron, cobalt, nickel, copper, and silver. In some embodiments, the metal electrodes are attached by hot pressing. In some embodiments, the metal electrodes are attached to the nanocomposite directly. In alternative embodiments, the metal electrodes are attached to the nanocomposite with an intervening material such as an adhesive.

In some embodiments, the heater has a heating exchange coefficient by convection of 1 to 100 Wm$^{-2}$K$^{-1}$, preferably 5 to 90 Wm$^{-2}$K$^{-1}$, preferably 7.5 to 80 Wm$^{-2}$K$^{-1}$, preferably 10 to 75 Wm$^{-2}$K$^{-1}$. In some embodiments, the heater has a heating exchange coefficient by radiation of 0.5 to 50 Wm$^{-2}$K$^{-1}$, preferably 1 to 40 Wm$^{-2}$K$^{-1}$, preferably 2 to 30 Wm$^{-2}$K$^{-1}$, preferably 5 to 25 Wm$^{-2}$K$^{-1}$. In some embodiments, the heater reaches a maximum working temperature of 40 to 130° C., preferably 50 to 120° C., preferably 60 to 110° C. when subjected to a working power of 0.11 to 0.21 W/cm$^3$, preferably 0.125 to 0.2 W/cm$^3$, preferably 1.5 to 1.75 W/cm$^3$.

In preferred embodiments, the heater is operated in the first temperature region of the nanocomposite where the nanocomposite has a positive temperature coefficient. In preferred embodiments, the heater is a self-regulating heater when operated in the aforementioned temperature region.

According to a fourth aspect, the present disclosure also relates to a thermistor comprising the conductive nanocomposite. A thermistor refers to a type of resistor, the resistance of which is dependent on temperature. In preferred embodiments, the thermistor has a positive temperature coefficient in a first thermistor temperature region and a negative temperature coefficient in a second thermistor temperature region. In some embodiments, the first thermistor temperature region is the same region as the first temperature region of the nanocomposite. In some embodiments, the second thermistor temperature region is the same region as the second temperature region of the nanocomposite.

The examples below are intended to further illustrate protocols for preparing, characterizing the polyolefin-carbon nanomaterial composite and uses thereof, and are not intended to limit the scope of the claims.

EXAMPLES

Example 1

Preparation of Nanocomposites and Heating Layer

Butyl rubber (IIR) rubbers and polyethylene oxide (PEO) (from Japan Synthetic Rubber Co) were used as a matrix polymer. The graphene (G) nanosheets and carbonyl iron nanoparticles with particle size 8 nm and used as electrical conductive fillers was purchased from Kojundo Chemical Laboratory Co. (Japan). All chemicals were used without any further treatment. The composites of BR/PEO with 2 weight percent graphene nanosheets and with different weight percent of carbonyl iron nanoparticles (0, 1, 2, 3, and 4 wt %) were fabricated in ratios of 98/02, 97/03, 96/04, 95/05, and 94/06 (wt %) and are designated GF0, GF1, GF2, GF3 and GF4, respectively, where the numbers indicate the weight percentages of iron carbonyl in the composites. A series of BR/PEO/G loaded with different weight percent of carbonyl iron nanoparticles were fabricated by conventional rubber techniques in a two roll mill (diameter 150 mm, working distance 200 mm, slow speed 15 rpm, gear ratio 1.33 and and the nip gap of about 1 mm at a temperature of 30° C. Then, the other chemical ingredients including curing agent were inserted to the composite during the roll-mixing process according to the standard compounding procedures. An overall mixing time of 2 h at 30° C. was allowed to ensure uniform and efficient dispersion of conductive particles in the rubber matrix. The speed of the front roll was less than the speed of the back roll to prevent bagging of the base polymer; the speed ratio was 1:1.4. The mill was operated at 30° C. with cold water circulated through the rolls to prevent excessive heat generation during mixing. After that, the compounded rubber was left at least 72 h before curing. Finally, the curing of the nanocomposites were performed in an electrically heated press between stainless steel sheets at a temperature of 140° C. and under a pressure of about 200 kN/m$^2$ for dwelling time of 5 h. A thin brass electrode was applied to the large area surfaces during the curing process to minimize the contact resistance for further characterizations.

Example 2

Scanning Electron Microscopy (SEM) Analysis of the Prepared Nanocomposite Layer

Figure 2:
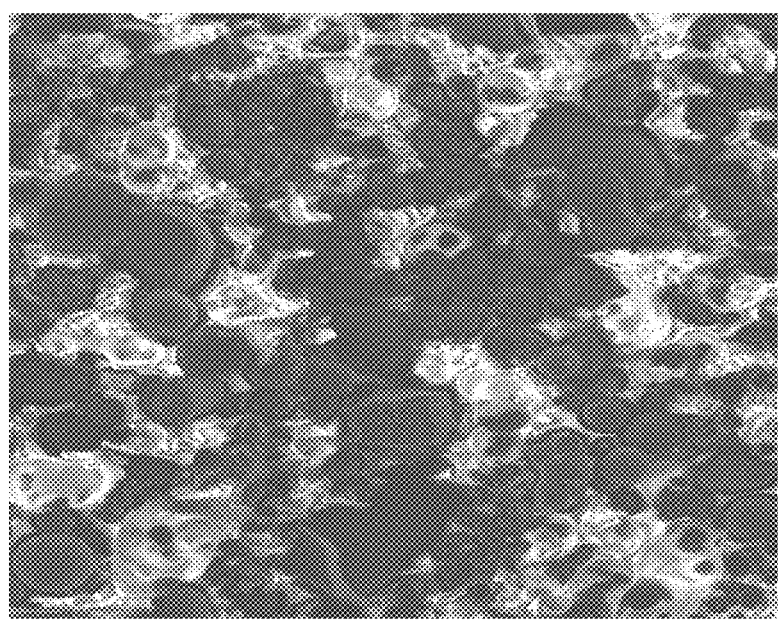
FIG. 2 is a scanning electron microscope (SEM) micrograph of the nanocomposite.

In order to find out the effect of carbonyl iron nanoparticles weight percent on the microstructure and dispersion of as fabricated IIR/PEO/G nanocomposites, the FESEM was conducted. The FESEM of nanocomposite is given in FIG. 2. The conductive carbonyl iron nanoparticles are well dispersed and interaction with polymer matrix. With increasing carbonyl iron weight percent i.e. sample GF4 the gap distance among conductive sites decreases, low level of agglomeration and good homogeneity achieve entire polymer matrix, in turn of lower electrical resistivity of nanocomposites.

Example 3

Transmission Electron Microscopy (TEM) Analysis of the Prepared Nanoparticles

Figure 3:
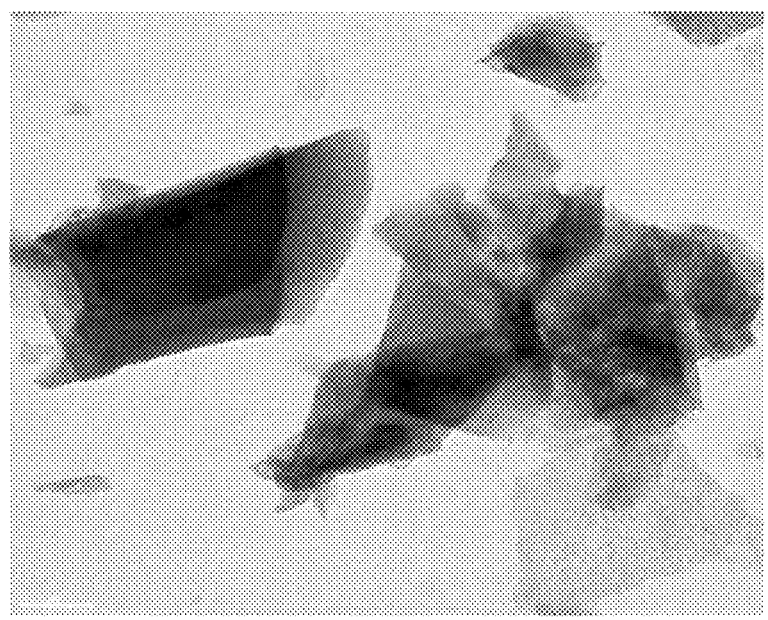
FIG. 3 is a transmission electron microscope (TEM) micrograph of the graphene nanosheets.

Detailed morphology of the as synthesized graphene nanoparticles was examined by a transmission electron microscope (TEM). FIG. 3 shows TEM micrograph of graphene (G) nanoparticles. The FESEM analysis revealed that the graphene are plates in shape and wrinkles with average size of 8 nm. The graphene have a multi-layered structure with smooth surface and low edge defects.

Example 4

Electrical Resistivity-Temperature Characteristics of the Nanocomposites

Figure 4:
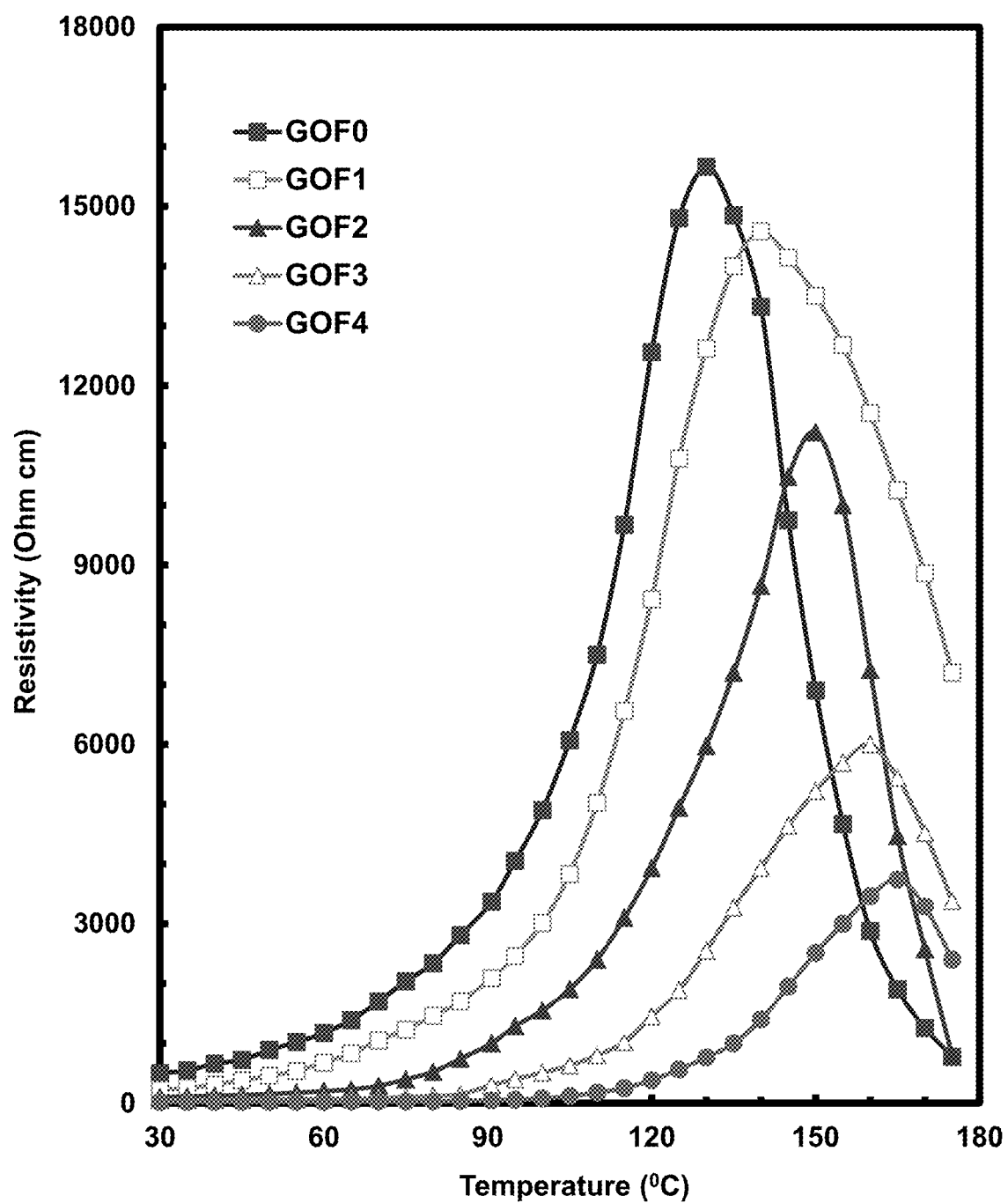
FIG. 4 is a plot of the resistivity vs. temperature characteristics of the heater.
Figure 5:
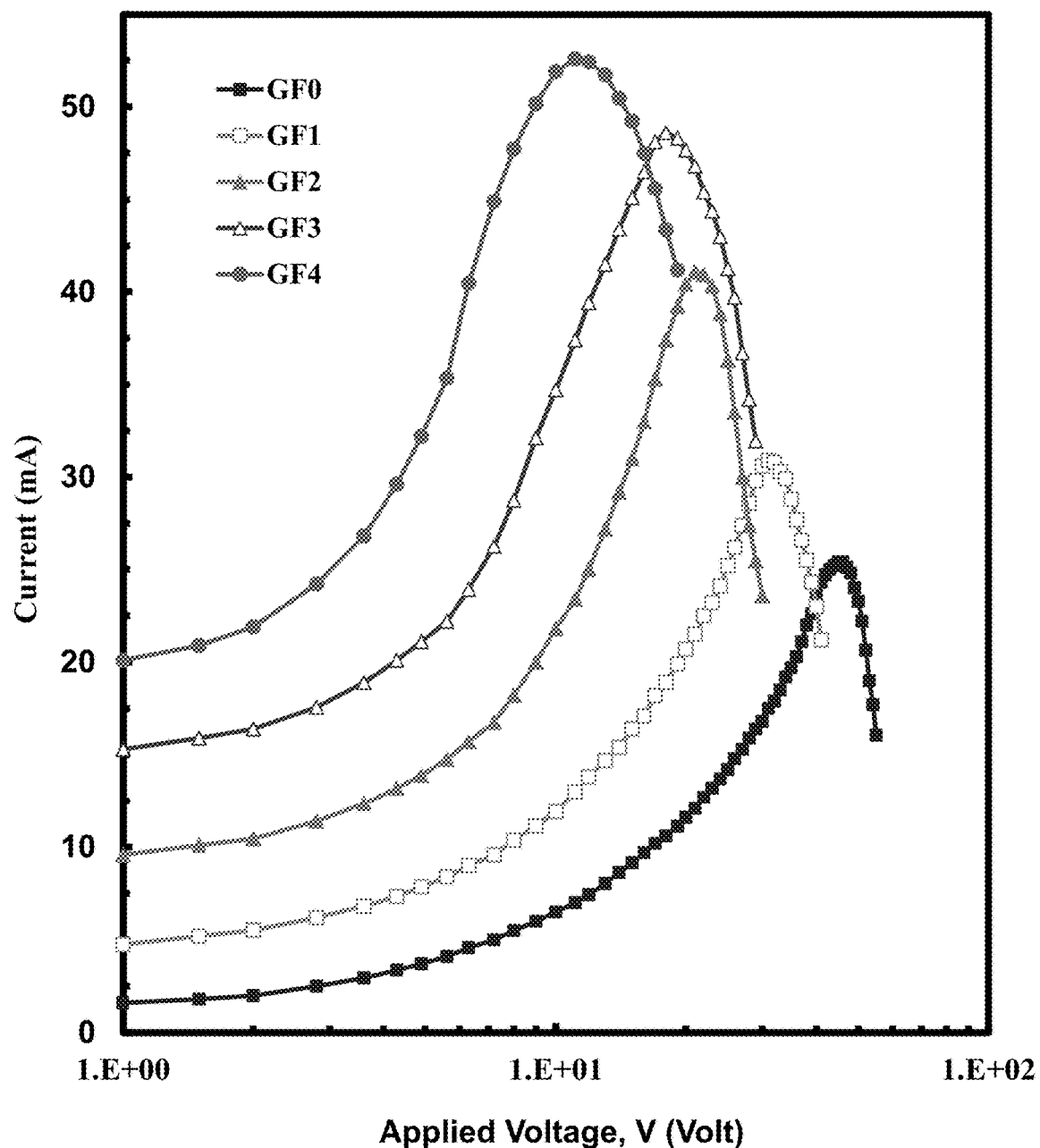
FIG. 5 is a plot of the current vs. applied voltage characteristics of the heater.

The electrical resistivity-temperature characteristics of the IIR/PEO/GO nanocomposites with different carbonyl iron content is displayed in FIG. 4. The room temperature resistivity values decreases with increasing iron carbonyl nanoparticles weight percent into nanocomposites. This may be due to nonhomogeneous dispersion of carbonyl iron nanoparticles throughout the nanocomposite. Such a non-homogeneous distribution may promote the formation of conductive filaments of closely spaced carbonyl iron particles throughout the volume of the nanocomposites. The fabricated nanocomposites exhibit a typical PTCR and NTCR thermistors characteristics. A sharp electrical resistivity increase (i.e. PTC effect) is generally seen at relatively high temperature namely switching temperature follows the negative temperature coefficient (NTC) effect dependence on carbonyl iron weight percent into nanocomposites.

Example 5

Current-Temperature Characteristics of the Heater

Figure 6:
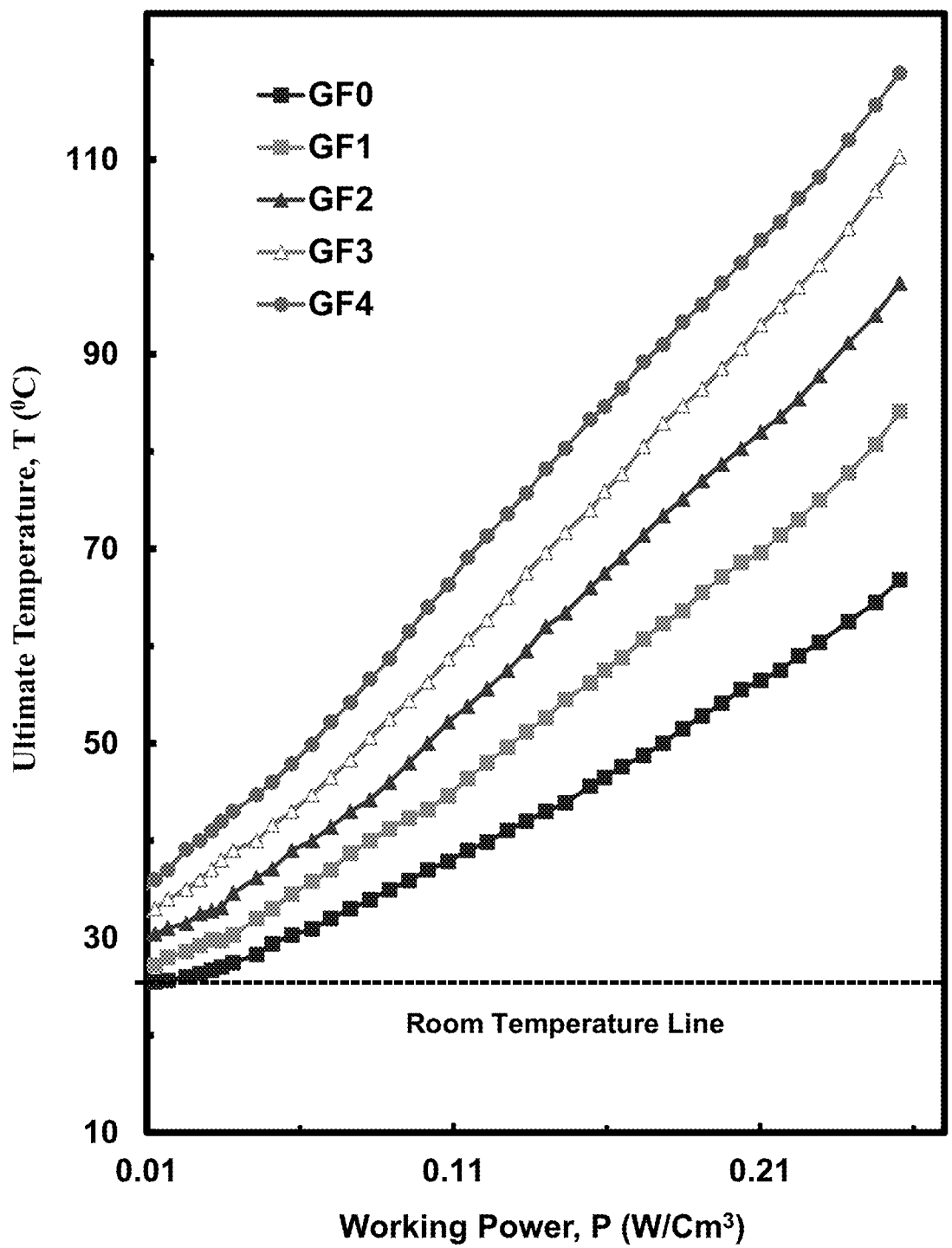
FIG. 6 is a plot of the temperature vs. working power characteristics of the heater.
Figure 7:
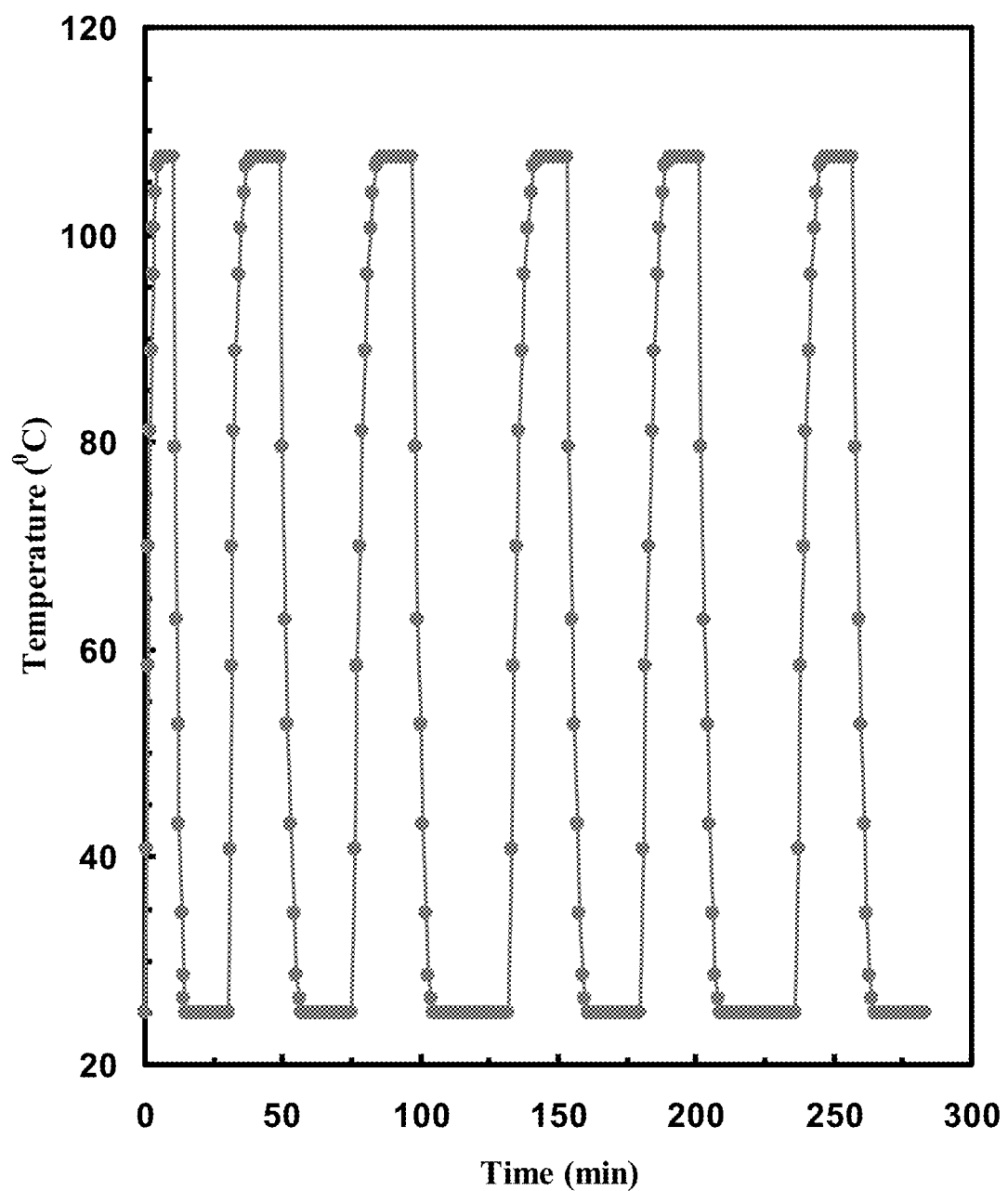
FIG. 7 is a plot of the temperature responses of the heater to many cycles of applied voltage showing no change in working temperature.

FIG. 6 shows the current-voltage (I-V) of the heater. The switching point, which is referred to as the negative resistance was observed. Assuming $I=\delta V^\gamma$, it is found through numerical treatment that $\delta=0.0018$, $\gamma=1.321$ for low applied voltages. This is nearly a typical linear behavior (Ohmic regime). The linear behavior is associated with space charge phenomena in the contact regime. At low contents of carbonyl iron nanoparticles a few continuous conducting channels across the sample. Hence, it is feasible to state that conduction is dominated by electron tunneling across small gaps separating conductive particles. In linear regime, the nanocomposite is in thermal equilibrium and no self-heating takes place. At voltages higher than the threshold voltage depending on carbonyl iron weight percent, $\delta=0.078$ and $\gamma=1.832$, the I-V relationship is thus characterized by non-linear behavior (non-Ohmic regime).

Example 6

Ultimate Temperature-Working Power Characteristics of the Heater

The working power-temperature (P-T) of IIR/PEO/GF conducting nanocomposites is displayed in FIG. 6. The temperature increases with increasing applied power. The variation of temperature with working power is linear, which makes the proposed nanocomposites a very useful in temperature probes.

Example 7

Temperature-Time Responses of the Heater

FIG. 8 shows the responses of temperature-time to a certain applied power on and off for several cycles were obtained for sample GF4 at an applied power of 0.22 W/cm³. The optimum temperature did not change with repeated power cycles (i.e., reversible behavior) for sample GF40. This argument indicates that the carbonyl iron nanoparticles improved the thermodynamic stability and molecular structure of the polymer matrix.

The invention claimed is:

1. A method of making an elastomeric conductive nanocomposite, the method comprising:
   mixing an elastomer, a polyether selected from the group consisting of polymethylene oxide, polyethylene oxide, polypropylene oxide, graphene nanoparticles, and transition metal nanoparticles at 20 to 50° C. for 30 minutes to 4 hours to form a mixture;
   aging the mixture for 24 to 168 hours to form an aged mixture; and
   pressing the aged mixture at a temperature of 100 to 180° C. to form an elastomeric conductive nanocomposite comprising a mixed polymer matrix of the elastomer and the polyether, with the graphene nanoparticles and the transition metal nanoparticles dispersed therein, and having a nonlinear relationship between resistivity and temperature in the region of 25 to 180° C. characterized by an exponential increase reaching a peak resistivity followed by an exponential decrease, and
   wherein the elastomeric conductive nanocomposite has a peak resistivity of 2,500 to 18,000 ohm·cm at a temperature of 100 to 180° C.

2. The method of claim 1, wherein the transition metal nanoparticles are present in the elastomeric conductive nanocomposite formed by the aging in an amount of 0.5 to 10 wt % based on a total weight of the elastomeric conductive nanocomposite.

3. The method of claim 1, wherein the transition metal nanoparticles have a mean particle size of 0.33 to 50 nm.

4. The method of claim 1, wherein the transition metal nanoparticles are carbonyl iron nanoparticles.

5. The method of claim 1, wherein the aging is conducted for a time sufficient such that the elastomeric conductive nanocomposite has a positive temperature coefficient in a first temperature region and a negative temperature coefficient in a second temperature region.

6. The method of claim 1, wherein the pressing is performed at 1 to 1000 kN/m².

7. The method of claim 1, wherein the pressing is performed for 1 to 10 hours.

* * * * *